Patented Dec. 6, 1938

2,139,325

UNITED STATES PATENT OFFICE 2,139,325

MANUFACTURE OF 4-AMINO-AZO-BENZENE-4'-SULPHONIC ACID

Charles B. Biswell and Walter V. Wirth, Woodstown, N. J., assignors to E. I. du Pont de Nemours & Company, Wilmington, Del., a corporation of Delaware No Drawing. Application February 2, 1937, Serial No. 123,602

6 Claims. (Cl. 260—205)

This invention relates to the manufacture of 4-amino-azo-benzene-4'-sulphonic acid, and more particularly to processes of making the product by the acid hydrolysis of the alkali salt of omega-sulphonic-acid of 4-alkyl-amino-azo-benzene-4'-sulphonic acid, and to a new improved product.

Heretofore 4-amino-azo-benzene sulphonic acid was prepared from the omega sulphonic acid of 4-methylamino-azo-benzene-sodium sulphonate by a process in which the 4'—SO₃H group and the —CH₂.SO₃Na group were replaced with hydrogen by a hydrolytic decomposition reaction. This process consisted of mixing the sodium salt of the omega-sulphonic-acid of 4-methyl-amino-azo-benzenesulphonic acid with a mineral acid at ordinary atmospheric temperatures, at which temperature the first part of the process was conducted at a relatively slow rate for a period of time. Thereafter the acidified reaction medium was heated to finish the reaction and attain the maximum yield of product. However, this process gave relatively low yields of the product. It produced a product containing foreign substances which resulted in dyes having poor discharge properties when they were used as intermediates in making the dyes, namely in that the discharged portions of the dyed fabric had a dull yellowish or brownish shade. According to other prior art processes, the hydrolytic decomposition of the —CH₂—SO₃Na was carried out in the presence of alkalies, such as sodium hydroxide. The latter processes gave somewhat better yields than the former but the characteristics and properties of the products were similar and they produced similar undesirable results when they were used as intermediates. Even in making these relatively impure products, it was necessary to apply purification processes to these products in order to obtain a satisfactory product. Therefore, it is desirable to provide new processes and improved products, both from considerations of yield and cost of production and from the consideration of the quality of the product.

It is an object of the present invention to provide a 4-amino-azo-benzene-4'-sulphonic acid product having improved properties. Another object of the invention is to provide new processes for producing the product economically, and in high yield and quality. Another object of the invention is to provide processes by means of which a purified product can be separated from the reaction mixture in which it is formed by simple acts of filtration and washing. These and still other objects of the invention will be apparent from the following more detailed description.

The objects of the invention are accomplished generally by operating directly upon the alkali metal salt of the omega-sulphonic-acid of a 4 - alkyl - amino-azo-benzene-4'-sulphonic acid. This salt may be made by coupling p-diazo-benzene sulphonate and an alkyl-aniline-omega-sodium-sulphonate in sodium acetate solution by methods known to the art, but any method of making this compound and other alkali metal salts of the compound can be used.

The resulting alkali metal salt of the omega-sulphonic-acid of 4-alkyl-amino-azo-benzene-4'-sulphonic-acid is hydrolyzed to 4-amino-azo-benzene-4'-sulphonic-acid by adding the coupling suspension or solution to a hot solution of a non-oxidizing mineral acid, such as hydrochloric or sulphuric acid which is heated to a sufficiently high temperature, say about 80° to about 105° C., which acid is present in sufficient excess, say about 3 to 20 equivalents of acid so that the reaction takes place at a highly rapid rate from the start of the reaction, the alkali metals are combined with the acid and the impurities formed during the reaction are readily and continuously dissolved as they are formed and removed in solution by the acidic reaction medium. The quantity of acid is regulated so as to provide an excess of acid in the final mixture after the reaction is completed of about 1.5 to about 3.0 grams of the mineral acid per 100 cubic centimeters. The acid concentration is desirably such that it varies from an initial strength of about 8% to a final strength of about 4%. The temperature of the acid hydrolysis medium is kept at the elevated temperature throughout the addition of the coupling mass. The temperature may then be dropped to a convenient working temperature, say about 60° C., and the precipitated product filtered off and washed.

Example I (1) Diazotization of sulphanilic acid: 279.5 lbs. of 30% HCl were added to a solution of 195 lbs. of sodium sulphanilate (1 mol), in 1712 lbs. of water, to precipitate free sulfanilic acid. The suspension was cooled to 5° C. by adding ice, and sufficient 30% sodium nitrite solution was run in to diazotize all of the sulphanilic acid at temperatures below 10° C. A test for a slight excess of nitrous acid was maintained for ½ hour. 171 lbs. of hydrated sodium acetate (molecular weight 136.7) were added to make the charge neutral to Congo red indicator and acid to litmus indicator. Ice was added to cool the suspension to 5° C. The total ice used was about 980 lbs.

(2) Coupling to methyl-aniline-omega-sodium sulphonate. 215.2 lbs. of 100% methyl-aniline-omega-sodium-sulphonate (molecular weight 209) in the form of about an 80% paste, were dissolved in about 1000 lbs. of water. The solution was cooled to 5° C. with about 900 lbs. of ice. The diazo suspension made in accordance with (1) was run in and the mass which was still slightly acid to litmus was stirred 20 to 25 minutes to effect complete coupling. The coupled compound may be represented by the formula

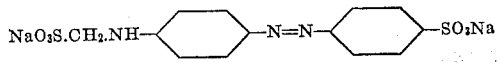

(3) Acid hydrolysis of the omega-sulphonate of 4-methyl-amino-azo-benzene-4'-sulphonic-acid (sodium salt). 3500 lbs. of water and 690 lbs. of 30% HCl were added to a wooden tub and heated to 95° C. This solution contained about 5.7 mols of HCl per mol of the compound to be treated. Without separating the coupling compound, the coupling mass was run into the hot dilute acid at such a rate that the temperature was held at 95°–100° C. during the addition. The reaction medium can be heated or cooled if necessary to maintain the desired temperature. The temperature was kept at 95–100° C. for 30 minutes after the addition was completed and then the mass was cooled to 60° C. The precipitated amino-azo-benzene-sulphonic-acid was filtered off and washed free of mineral acid.

249.5 lbs. of 100% amino-azo-benzene-sulphonic-acid (molecular weight 277.2) in the form of a 30–35% hydrous paste were obtained. The yield was 90% of theory, based on the sulphanilic acid used as the starting material.

*Example II*

For the HCl used in the sulphanilic diazotization 141 lbs. of 78% $H_2SO_4$ were used. The acid hydrolysis tub was charged with 4000 lbs. of water and 440 lbs. of 78% $H_2SO_4$, and the solution was heated to 95°–98° C. This solution contained about 3.6 mols of $H_2SO_4$ per mol of compound to be treated. The coupling mass was run into the heated acid during a period of ½ hour, during which time the reaction mass was kept at 95°–98° C. After the coupling mass was added, the reaction mass was held at 95°–98° C. for ½ hour. It was then cooled to 60° C. and the product was filtered off and washed free of mineral acid. The quality of the product and the yield were about the same as that obtained in accordance with Example I.

The hydrolysis may be represented by the following equation:

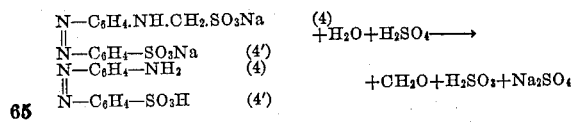

Portions of the products from Examples I and II were used to make a red azo dye formed by coupling diazotized amino-azo-benzene sulphonic acid to p-amino-benzoyl-J-acid. The dye was developed on cotton with beta naphthol and then printed with a discharge paste containing sodium hydrosulphite. After heating in steam the discharged pattern was white and free from a yellowish or brownish shade.

When 4-amino-azo-benzene-4'-sulphonic acid as produced by the described prior art methods was used in the same manner, the discharged portions of the dyed cloth were always a dull yellow or brownish color.

Other alkali salts of the omega-sulphonic-acid of 4-alkyl-amino-azo-benzene-4'-sulphonic acid instead of the sodium salt of the compound, such as the potassium salt can be used. Likewise the various alkyl derivatives can be used, such as the methyl, ethyl or propyl. For the best results the concentration of the acid in the hydrolyzing reaction medium can be varied from about 3 to about 20 equivalents of the acid per mol of the hydrolyzed compound, but more or less concentrated acid can be used, the concentration of the acid being chosen with a view to economy of operation, yield of product and quality of product. From the latter considerations the temperature of the acid may be varied from about 80° C. to about 105° C.

Still other modifications will be suggested to those skilled in the art without departing from the spirit and scope of the invention, and it is to be understood that no limitations are intended except such as are specifically recited in the claims or are imposed by the prior art.

We claim:

1. In a process for manufacturing 4-amino-azo-benzene-4'-sulphonic acid, the steps which comprise heating a solution of non-oxidizing acid to about 90° C. to about 100° C. adding the sodium salt of omega-sulphonic acid of 4-methyl-amino-azo benzene-4'-sulphonic acid to the solution, said nonoxidizing acid being capable of converting the alkali metal sulphonic acid group to the sulphonic acid group and of causing hydrolytic decomposition of the alkyl-alkali-metal sulphonic acid group, and maintaining the temperature of the reaction mixture approximately within said temperature range until 4-amino-azo-benzene-4'-sulphonic acid is formed.

2. In a process for manufacturing 4-amino-azo-benzene-4'-sulphonic acid, the steps which comprise heating a solution of non-oxidizing acid to about 90° C. to about 100° C. adding the sodium salt of omega-sulphonic acid of 4-methyl-amino-azo-benzene-4'-sulphonic acid to the solution, said nonoxidizing acid being capable of converting the alkali metal sulphonic acid group to the sulphonic acid group and of causing hydrolytic decomposition of the alkyl-alkali-metal sulphonic acid group, said acid solution containing an equivalent of about 3 to about 10 mols of sulphuric acid per mol of the compound to be hydrolyzed, and maintaining the temperature of the reaction mixture approximately within said temperature range until 4-amino-azo-benzene-4'-sulphonic acid is formed.

3. In a process for manufacturing 4-amino-azo-benzene-4'-sulphonic acid, the steps which comprise progressively adding an alkali metal salt of the omega-sulphonic acid of a 4-alkyl-amino-azo-benzene-4'-sulphonic acid to a solution of a non-oxidizing mineral acid which is at a temperature of about 90° to about 100° C. and contains an excess of the acid over that which will convert the alkali metal sulphonic acid group in the alkali metal salt to the sulphonic acid group and cause hydrolytic decomposition of the alkyl-alkali metal sulphonic acid group, whilst continuously hydrolyzing said salt and excluding therefrom other compounds formed during said reaction, and separating said hydrolyzed compound from said solution.

4. In a process for manufacturing 4-aminoazo-benzene-4′-sulphonic acid, the steps which comprise adding the sodium salt of the omega-sulphonic acid of 4-methyl-amino-azo-benzene-4′-sulphonic acid to a solution of acid which is heated to about 95° C. to about 105° C. and contains about 3 to 20 mols of hydrochloric acid per mol of the compound to be treated, and maintaining the temperature of the reaction mixture approximately within said temperature range until 4-amino-azo-benzene-4′-sulphonic acid is formed.

5. In the process of manufacuring 4-amino-azo-benzene-4′-sulphonic acid, the steps which comprise adding the sodium salt of the omega-sulphonic acid of 4-methyl-amino-azo-benzene-4′-sulphonic acid to a solution of sulphuric acid which is heated to about 95° C. to about 105° C. and contains about 3 to 10 mols of sulphuric acid per mol of compound to be treated, and maintaining the temperature of the reaction mixture approximately within said temperature range until 4-amino-azo-benzene-4′-sulphonic acid is formed.

6. A 4-amino-azo-benzene-4′-sulphonic acid substantially identical with that which may be produced by coupling methyl-aniline-omega-sodium sulphonate and diazotized sulphanilic acid in a reaction medium, slowly and progressively adding the coupling product and the reaction medium in which it was formed to a hydrochloric acid solution which is heated to about 95° C. to about 100° C. and contains about 6 to about 20 mols of hydrochloric acid per mol of the coupling product, maintaining said temperature during the addition and for about 30 minutes after the addition is completed, cooling to about 60° C., filtering out the precipitate and washing the same free of acid.

CHAS. B. BISWELL.
WALTER V. WIRTH.